US012718694B2

(12) United States Patent
Haefner et al.

(10) Patent No.: US 12,718,694 B2
(45) Date of Patent: Aug. 25, 2026

(54) METHODS AND DEVICES FOR AUTOMATIC COOPERATIVE MANEUVERS

(71) Applicants: Bayerische Motoren Werke Aktiengesellschaft, Munich (DE); Fraunhofer-Gesellschaft Zur Förderung Der Angewandten Forschung e. V., Munich (DE)

(72) Inventors: Bernhard Haefner, Munich (DE); Josef Jiru, Munich (DE); Henning Schepker, Munich (DE)

(73) Assignees: Bayerische Motoren Werke Aktiengesellschaft, Munich (DE); Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 31 days.

(21) Appl. No.: 18/689,371

(22) PCT Filed: Sep. 21, 2022

(86) PCT No.: PCT/EP2022/076181
§ 371 (c)(1),
(2) Date: Mar. 5, 2024

(87) PCT Pub. No.: WO2023/046728
PCT Pub. Date: Mar. 30, 2023

(65) Prior Publication Data

US 2024/0355210 A1 Oct. 24, 2024

(30) Foreign Application Priority Data

Sep. 21, 2021 (DE) ..................... 10 2021 124 390.4

(51) Int. Cl.
*G08G 1/16* (2006.01)
*G06N 3/08* (2023.01)
*H04W 4/44* (2018.01)

(52) U.S. Cl.
CPC ............... *G08G 1/167* (2013.01); *G06N 3/08* (2013.01); *H04W 4/44* (2018.02)

(58) Field of Classification Search
None
See application file for complete search history.

(56) References Cited

U.S. PATENT DOCUMENTS

2018/0225975 A1* 8/2018 Park ..................... G05D 1/0212
2018/0359904 A1* 12/2018 Foster .................. G05D 1/0223
(Continued)

FOREIGN PATENT DOCUMENTS

DE 102018109885 A1 12/2018
DE 102020004553 A1 10/2020

OTHER PUBLICATIONS

T. Kessler et al., "Cooperative Multi-Vehicle Behavior Coordination for Autonomous Driving." 2019 IEEE Intelligent Vehicles Symposium (IV), IEEE, pp. 1953-1960, 2019.
(Continued)

*Primary Examiner* — Amelia Vorce
(74) *Attorney, Agent, or Firm* — BLANK ROME LLP

(57) ABSTRACT

A method for calculating a cooperative maneuver for at least two machines. The method includes the steps of: obtaining environmental information pertaining to a common environment of the at least two machines; generating a plurality of cooperative maneuvers, each comprising at least one maneuver for each of the at least two machines, based on the environmental information; evaluating each cooperative maneuver based on a predefined quality criterion, wherein the evaluation of each cooperative maneuver comprises
(Continued)

evaluating only a part of the maneuvers included in the cooperative maneuver based on the predefined quality criterion; selecting a cooperative maneuver based on a value of the quality criterion as determined by the evaluation; providing the selected cooperative maneuver for the at least two machines; and performing a maneuver of the selected cooperative maneuver by at least one of the at least two machines.

20 Claims, 5 Drawing Sheets

(56) References Cited

U.S. PATENT DOCUMENTS

| | | | | |
|---|---|---|---|---|
| 2019/0339712 | A1* | 11/2019 | Williams | G05D 1/223 |
| 2020/0151564 | A1 | 5/2020 | Sarvedani et al. | |
| 2020/0183416 | A1* | 6/2020 | Cheng | H04L 67/12 |
| 2021/0031800 | A1 | 2/2021 | Fuchs et al. | |
| 2021/0041869 | A1* | 2/2021 | Meyer | G08G 1/0108 |
| 2022/0105955 | A1* | 4/2022 | Shridhar | G08G 1/166 |
| 2022/0365540 | A1* | 11/2022 | Rosales | G05D 1/0214 |

OTHER PUBLICATIONS

Internationational Search Report and Written Opinion for PCT/EP2022/076181, 10 pages.

* cited by examiner

Output: Cooperation Maneuver $man_{best}$

Input: Current Environment $env_{cur}$

```
ω_best ← −∞; id_best ← −1; man_best ← man_empty;
i ← 0;
while i ≤ n_gen do
    man ← GenerateRandomManeuver(env_cur);
    success ← SuccessClassifier(man);
    if success then
        i ← i + 1;
        ω_pred ← NNPrediction(man);
        if ω_best < ω_pred then
            id_best ← i;
            ω_best ← ω_pred;
            man_best ← man;
        end
    end
end
```

Fig. 4

Table 1

| Parameter | Value/Range | Parameter | Value/Range |
|---|---|---|---|
| $v_0$ $(\mathrm{km\,h^{-1}})$ | [70; 90] | $n_{\mathrm{rv}}$ | [1; 3] |
| $v_1$ $(\mathrm{km\,h^{-1}})$ | [90; 110] | $s_{\mathrm{rv}}$ (m) | [10; 150] |
| $v_2$ $(\mathrm{km\,h^{-1}})$ | [110; 130] | $s_{\mathrm{hvrv}}$ (m) | [50; 150] |
| $v_{\mathrm{diff}}$ $(\mathrm{km\,h^{-1}})$ | 15 | $s_{\mathrm{dist}}$ (m) | 50 |

Fig. 5

Table 2

| Parameter | Range | Parameter | Range |
|---|---|---|---|
| $n_{\mathrm{hvc}}$ | [3; 5] | $t_{\mathrm{cl}}$ (s) | [3; 7] |
| $n_{\mathrm{rvc}}$ | [1; 2] | $t_{\mathrm{cs}}$ (s) | [1; 5] |
| | | $t_{\mathrm{cn}}$ (s) | [1; 30] |

Fig. 6

Table 3

| Category | $\gamma_l$ | $\gamma_{\mathrm{hv}}$ |
|---|---|---|
| 1 | 0.2 | 0.8 |
| 2 | 0.5 | 0.5 |

Fig. 7

Table 4

| Parameter | Explanation |
|---|---|
| Description of initial situation | |
| $n_{rv} + 1$ | Number of current vehicles |
| $n_{hvc} + n_{rvc}$ | Number of executed vehicle containers |
| $v_{hv}$ | Velocity of the HV |
| $l_{hv}$ | Lane of the HV |
| $s_{rv,k}$ | Position of each RV k |
| $v_{hv} - v_{rv,k}$ | Relative velocity of each RV k to HV |
| $l_{hv} - l_{rv,k}$ | Relative lane of each RV k (except RV 1) to HV |

For each of the maximum $\bar{n}_{hvc} + \bar{n}_{rvc}$ maneuvre containers:

| Parameter | Explanation |
|---|---|
| $t_{start}$ | Start time |
| $t_{exec}$ | Duration, i.e t_cl, t_cn, or t_cs |
| $l_{target}$ | Relative target lane for lane changing maneuver |
| $v_{target}$ | Relative target velocity for velocity changing maneuver |

Fig. 8

METHODS AND DEVICES FOR AUTOMATIC COOPERATIVE MANEUVERS

RELATED APPLICATIONS

This application is a national phase of PCT/EP2022/076181, filed on Sep. 21, 2022, which claims priority to DE 10 2021 124 390.4, filed Sep. 21, 2021. The contents of this application is hereby incorporated by reference in its entirety.

TECHNICAL FIELD

The present disclosure relates to methods and devices for providing cooperative maneuvers involving a plurality of machines, in particular vehicles.

BACKGROUND

Cooperative maneuvers refer to maneuvers in which more than one machine is involved in a shared environment. By selecting a suitable cooperative maneuver, for example, a traffic flow can be optimally controlled and/or the safety of several machines sharing a workspace can be increased. There are various approaches and protocols for performing cooperation maneuvers. However, there are no solutions for automatically generated cooperation maneuvers in particular. Improvements in these areas are desirable.

DESCRIPTION

An object is to provide methods and devices for cooperative maneuvers involving several machines in a common workspace.

This object is solved by the disclosed technology, which is defined by the subject matter of the independent claims. The dependent claims relate to corresponding further embodiments. In the following, various aspects and embodiments of these aspects are disclosed, which provide additional features and advantages.

Some embodiments of the disclosure solve the specific task of generating and providing a cooperative maneuver for overtaking one or more vehicles. This can be done by machine learning to provide safe and performant maneuvers under real-time conditions. For this purpose, a classifier is first trained on a given maneuver success. This separates successful from unsuccessful maneuver candidates. In addition, a regression model is trained on an extensive data set of randomized initial situations. The regression model can be used to distinguish good from bad cooperation maneuvers within the set of successful cooperation maneuvers and ultimately identify an optimal cooperation maneuver. Using appropriately weighted quality functions, optimization can be achieved for different objectives such as jerk avoidance or length of the overtaking maneuver.

In the following, further aspects and embodiments of these aspects are disclosed in order to solve the above-mentioned problem.

A First Aspect Relates to a Method Comprising the Steps of:

- Obtaining a common environment information of at least two machines;
- Generating a plurality of cooperative maneuvers, each comprising one maneuver for each of the two machines, based on the environment information;
- Evaluating each cooperation maneuver on the basis of a predefined quality criterion;

- Selecting a cooperation maneuver that has a predetermined value of the quality criterion, in particular a best value;
- Providing the selected cooperation maneuver for the two machines.

A machine can be a vehicle, in particular a passenger car or a truck. A machine can also be a controlled flying object, e.g. an airplane, an airship, a balloon, or a drone. A machine can be a machine tool, in particular a robot, e.g. an industrial robot with serial and/or parallel kinematics. A machine can also be a construction machine, agricultural machine and/or a (driverless) transportation system. Instead of a machine, the procedure can also be carried out for a representation of a machine. This will be described in more detail later. This can be done in particular for simulation purposes, so that technical knowledge can be gained for several cooperating machines to be physically realized.

A cooperative maneuver comprises maneuvers for at least two machines that are involved in the cooperative maneuver. In particular, the maneuvers should be specified in such a way that the machines can successfully complete the cooperation maneuver. In particular, a cooperation maneuver can in principle comprise maneuvers which, if executed, could lead to damage or impairment of one machine by the other machine. These can, for example, be distinguished from unsuccessful and successful cooperation maneuvers by a corresponding evaluation.

Obtaining common environmental information may in particular comprise measuring and/or simulating. Additionally or alternatively, obtaining a common environment information may comprise receiving and/or retrieving this information. An environment from which the environmental information originates may comprise, for example, a common workspace of a plurality of robots. Additionally or alternatively, an environment may comprise a road on which a plurality of vehicles are moving. An environment may also be a railroad track. An environment may additionally or alternatively comprise an airspace.

In particular, a predetermined value of the quality criterion can comprise a predetermined range of values, e.g. overtravel distances of less than 100 meters. Furthermore, a predetermined value can include an extreme value, e.g. a minimum value or a maximum value.

Providing may include communicating and/or storing the information of the selected cooperation maneuver. For example, the selected cooperation maneuver can be stored in a memory location shared by the participating machines so that other machines can retrieve the information.

The provision can be made for the machine that performed the evaluation. Then the cooperation maneuver or at least the maneuver intended for the machine can be provided, in particular to be implemented by the machine.

Provisioning can include communication to one or more machines. In particular, if that machine has not performed the assessment. In particular, when the method is performed on an external device (for example, on an infrastructure device), providing the selected cooperation maneuver may be performed to all machines that the cooperation maneuver comprises.

In particular, the procedure can be carried out on one of the machines involved in the maneuver, for example on a host vehicle. The host vehicle can, for example, be the vehicle that is to overtake other vehicles. Additionally or alternatively, the method can also be carried out on an infrastructure device or on a machine not involved in the cooperation maneuver.

One embodiment of the first aspect relates to a method, wherein the environmental information is at least partially detected by sensors, in particular by one of the two machines.

Additionally or alternatively, the environmental information can also come from a third machine. Additionally or alternatively, the environmental information can also come from a simulation or modeling. Additionally or alternatively, environmental information can also originate from both machines from the environment and be observed by them, in particular by sensors. Additionally or alternatively, environmental information can come from an observer system, e.g. from an infrastructure information system, in particular if the machines are vehicles.

In particular, environmental information can include the number of machines involved in the cooperation maneuver and their statuses (position, speed, etc.). In particular, environmental information can include information about a traffic situation, for example about a road and/or an intersection.

One embodiment of the first aspect relates to a method, wherein a maneuver for a machine comprises a plurality of sub-maneuvers.

In particular, a maneuver may include sub-maneuvers that depend on the type of maneuver. For example, if the maneuver concerns an overtaking maneuver of a vehicle, a maneuver may include sub-maneuvers related to accelerating, changing lanes, decelerating and/or maintaining a current machine state. A maneuver can, for example, relate to longitudinal and lateral direction changes, position changes and/or height changes.

The maneuvers of a cooperation maneuver can in particular all comprise the same number and/or the same type of sub-maneuvers.

One embodiment of the first aspect relates to a method, wherein the maneuvers of the individual machines are of different lengths in terms of time and/or space.

The length of the maneuvers of a cooperation maneuver can be determined in particular in terms of space and/or time. If the maneuvers are determined in terms of time, the maneuvers of the individual machines have different durations. Additionally or alternatively, the length can be spatially determined. Then, for example, one machine in a cooperative maneuver can cover a longer distance than another machine. For example, in an overtaking maneuver, the overtaking vehicle generally covers a longer distance than a vehicle that is being overtaken.

One embodiment of the first aspect relates to a method, wherein the evaluation is performed only for a part of the maneuvers included in the cooperation maneuver.

In particular, an assessment can be directed at only one maneuver of a cooperative maneuver. This can be done in particular if the cooperation maneuver comprises only two machines. However, even if there are more than two machines, a single maneuver, in particular a predefined maneuver, can be used for the evaluation, e.g. the maneuver for an overtaking vehicle. Alternatively, the evaluation can be based on several, in particular all, maneuvers of a cooperation maneuver.

One embodiment of the first aspect relates to a method, wherein the evaluation is performed by a trained algorithm, in particular by a neural network.

In particular, a trained algorithm can include machine learning. In particular, training can take place on the basis of supervised learning or reinforcement learning. In particular, the algorithm may be based on previously machine-generated maneuvers and/or cooperation maneuvers. Additionally or alternatively, training can be carried out using a maneuver and/or cooperation maneuver that is currently taking place. The same can apply to testing a trained algorithm.

An embodiment of the first aspect relates to a method, wherein the evaluation is performed by a binary classification, wherein in particular successful cooperation maneuvers are distinguished from unsuccessful cooperation maneuvers.

In particular, the binary classification can be performed by a trained algorithm. The trained algorithm can in particular be based on machine learning, for example the binary classification can be carried out by an appropriately trained neural network. The binary classification can be used in particular to distinguish a successful cooperation maneuver from an unsuccessful cooperation maneuver, so that only successful cooperation maneuvers need to be processed further. This can shorten the processing time of the procedure. This is particularly useful if the procedure is executed under real-time conditions. Additionally or alternatively, a classification can also differentiate whether a safety distance is guaranteed, whether predetermined rules, for example traffic rules, are observed and/or whether a cooperation maneuver is efficiently composed of sub-maneuvers, for example in such a way that no superfluous maneuvers, for example duplicate maneuvers, are included. Additionally or alternatively, a classification can be made as to whether a successful resolution of dependent sub-maneuvers has taken place, whereby the dependent sub-maneuvers can be defined in particular between different maneuvers of a cooperation maneuver.

An embodiment of the first aspect relates to a method, wherein the evaluation is performed by a regression, by which in particular a quality of the cooperation maneuver is determined.

In particular, the regression can be performed by a trained algorithm. The trained algorithm can in particular be based on machine learning, for example the binary classification can be carried out by a correspondingly trained neural network. In particular, the regression can be performed after the binary classification. In particular, the regression can only be performed for successful maneuvers. Advantageously, this means that no cooperation maneuvers are evaluated with regard to their quality that are not realized anyway because they are not successful. This can shorten the processing time of the procedure. This is particularly useful if the procedure is to be generated and provided under real-time conditions, e.g. for an overtaking maneuver.

One embodiment of the first aspect relates to a method, wherein the quality criterion is composed of a plurality of evaluation variables and wherein the individual evaluation variables are weighted in particular.

An evaluation variable can be a position-based variable, for example a position, a distance traveled, a speed, an acceleration and/or a jerk. For example, an overtaking maneuver can be evaluated according to how much distance is required for it. This is because the distance in the lane can be a safety-relevant evaluation variable for oncoming vehicles, particularly in oncoming traffic.

In particular, the duration of a cooperation maneuver can be an assessment parameter. In accordance with the previous explanation, a duration can also be a safety-relevant assessment parameter.

An evaluation variable composed of several evaluation variables can, for example, be composed of a longest distance of a maneuver of a cooperation maneuver and of a jerk that is exerted on the machine by the maneuver. In particular, these evaluation variables can be weighted.

Depending on the selection of the weightings, different types of cooperative maneuvers can be specifically preferred.

An embodiment of the first aspect relates to a method, wherein providing the cooperation maneuver to at least one further machine takes place.

It is conceivable that a cooperation maneuver does not include maneuvers for all machines in the environment information. This may be the case, for example, if some machines are highly unlikely to have any influence on the cooperation maneuver. These machines can nevertheless be informed about the cooperation maneuver. This can be particularly advantageous if these machines have additional information that was not included in the environment information for the procedure, but which is nevertheless relevant for the cooperation maneuver. Then these machines can send the additional information to the machines of the cooperation maneuver and the cooperation maneuver can be adapted accordingly, if necessary. The information can be provided by communicating it to one or more machines and/or by storing it on a shared memory, such as a server, from which the machines can retrieve the information.

One embodiment of the first aspect relates to a method, wherein one of the two machines is a host machine and wherein the provisioning is performed by a host machine to at least the second machine.

Other method steps, in particular all steps of the method according to the first aspect, can also be performed on the host machine. If the cooperation maneuver comprises several machines, the host machine can provide the cooperation maneuver for all machines of the cooperation maneuver. Additionally or alternatively, the cooperation maneuver may also be provided by the host machine for machines not included in the cooperation maneuver, in particular if these could influence the cooperation maneuver.

An embodiment of the first aspect relates to a method comprising the step of:

- Confirmation of receipt of the information of the provided cooperation maneuver by at least one of the two machines.

In particular, confirmation can be provided by all machines for which the selected cooperation maneuver is provided. In particular, confirmation from all machines involved in the cooperation maneuver can be a prerequisite for the cooperation maneuver to be carried out.

A confirmation may in particular comprise an approval or a rejection of the cooperation maneuver. In particular, a rejection may comprise a counter-proposal for the cooperation maneuver or at least for the maneuver of the rejecting machine. In addition or alternatively, a rejection may comprise information on how the cooperation maneuver, in particular the maneuver of the rejecting machine, must be adapted so that an approval of this machine or for this machine can take place.

A Second Aspect Relates to a Machine Equipped for this Purpose:

- to obtain, in particular to detect by sensors, environmental information comprising at least two machines;
- to determine a number of cooperation maneuvers based on the environmental information, each of which has a maneuver for the two machines;
- evaluate each of the cooperation maneuvers on the basis of a predefined quality criterion;
- select a cooperation maneuver whose evaluation has a predetermined value of the quality criterion, in particular a best value;
- provide the cooperation maneuver for the two machines, in particular the maneuver assigned to the corresponding machine.

Embodiments of this aspect can be designed analogously to the first aspect.

One embodiment of the second aspect relates to a machine, wherein the device is an infrastructure unit.

Alternatively, the device can be a machine, a host machine, which is involved in the cooperation maneuver.

A Third Aspect Relates to a Method Comprising the Steps of:

- Obtaining a common environment information of at least two machine representations;
- Generating a plurality of cooperation maneuvers, each comprising one maneuver for each of the two machine representations, based on the environment information;
- Evaluate each cooperation maneuver on the basis of a predefined quality criterion;
- Selection of a cooperation maneuver whose evaluation has a predetermined value of the quality criterion, in particular a best value;
- Performing the selected cooperation maneuver for the two machine representations.

BRIEF DESCRIPTION OF THE FIGURES

Further advantages and features result from the following embodiments, which refer to the figures. The figures do not show the embodiments to scale. The dimensions of the various features may be enlarged or reduced accordingly, in particular for clarity of description. For this purpose it is shown, partly schematized, in:

FIG. 4 is a method in pseudo code according to one embodiment of the invention.

FIG. 5 is table 1;

FIG. 6 is table 2;

FIG. 7 is table 3;

FIG. 8 is table 4.

In the following description, reference is made to the accompanying drawings, which form part of the disclosure and in which specific aspects are shown for illustration purposes, in which the present disclosure can be understood. In the following descriptions, identical reference signs refer to identical or at least functionally or structurally similar features.

Generally, a disclosure about a described method also applies to a corresponding device to perform or make the method, or to a corresponding system comprising one or more devices, and vice versa. For example, when a particular method step is described, a corresponding device may comprise a feature to perform the described method step, even if this feature is not explicitly described or illustrated. On the other hand, if, for example, a particular device is described on the basis of functional units and/or structural features, a corresponding method may comprise a step that performs the described functionality or with which a corresponding structure can be produced, even if such steps are not explicitly described or illustrated. Similarly, a system may be provided with corresponding device features or with features to perform a particular method step. Features of the various aspects and embodiments described above or below may be combined with each other, unless explicitly stated otherwise.

DESCRIPTION OF THE FIGURES

Figure 1:
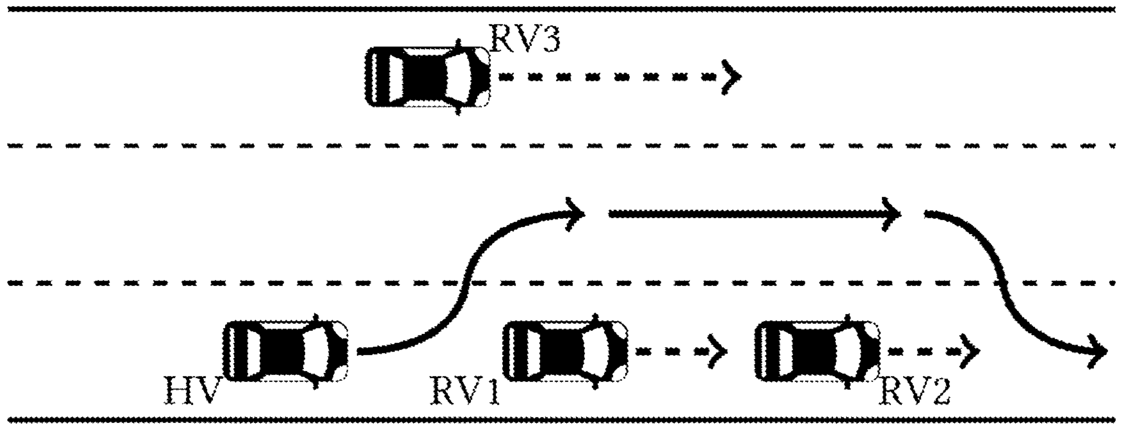
FIG. 1 is a scenario according to one embodiment of the invention.

FIG. 1 shows an example of the basic maneuver of a cooperative overtaking maneuver on a three-lane highway. The host vehicle (HV) in the present exemplary embodiment is the vehicle approaching a slower remote vehicle (RV) in the same lane (RV1), and it is also the one proposing an overtaking maneuver, as indicated by the solid arrows. It may take other vehicles into account, e.g. a vehicle (RV2) in front of the slower vehicle (RV1) or a vehicle in a different lane (RV3). All vehicles exchange their status (position, speed, acceleration) at regular intervals by sending Cooperative Awareness Messages (CAMs), which form the basis of the environment model available to each vehicle. Using these CAMs, the vehicles can classify distances and speeds relative to other vehicles and trigger a cooperative maneuver if necessary.

The problem to be solved for the HV, at least in this embodiment, is to suggest and perform a cooperative overtaking maneuver involving RV1 and possibly other vehicles present. This is intended to avoid collisions and enable a smooth and efficient flow of traffic.

Supervised learning makes it possible to separate data collection from evaluation. Different metrics for quality functions can be implemented by changing the quality function for training. Using a binary classifier to predict a maneuver success, followed by regression models to estimate the quality of a proposed maneuver, enables a quick decision on the success of a potential maneuver without the need to use resource-intensive regression models.

Figure 2:
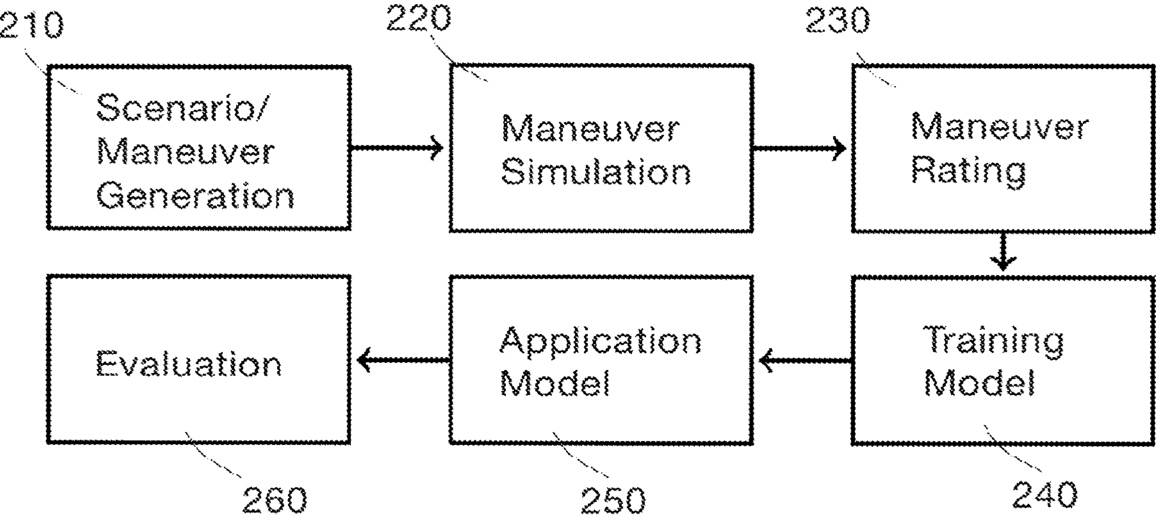
FIG. 2 is a flow diagram according to one embodiment of the invention.

A further embodiment of the disclosure is outlined in FIG. 2: First, a sufficiently large and diverse set of training data is generated in step 210. For this purpose, random scenarios are created, as described later. These define the number of vehicles present as well as their departure lane, starting position and speed. Then, in step 220, the HV proposes a random cooperative maneuver in each scenario, which is then simulated by all participants. Reasonable restrictions are applied, as described later. Finally, the success is evaluated and a quality function value is determined for each of these controlled maneuvers.

This data is used to train a binary classifier to predict the success of a maneuver and also a regression model to assess the quality of a maneuver as part of a supervised learning process. To evaluate the performance of a solution, the trained models can be applied, for example by simulating new scenarios or by testing the models in reality. The HV proposes the best of several random cooperation maneuvers for execution. First, the security of a random cooperation maneuver is evaluated using the binary classifier. If the cooperation maneuver is classified as safe, the regression model is used to evaluate the quality of the maneuver. This has the advantage of saving computing time. This is because the more computing time-intensive regression is only performed for the successful, for example the safe, cooperation maneuvers. After several maneuver candidates have been created, the best cooperation maneuver is selected and communicated to the surrounding vehicles via a wireless communication interface. The vehicles then perform the selected cooperation maneuver together. By evaluating the achieved quality of the cooperative maneuvers in a simulation, the performance of the models and the quality of the proposed cooperative maneuvers can be assessed.

A scenario generator can produce the basis of the raw data for learning. One aim is to cover the majority of scenarios that can occur in the desired type of cooperation maneuver.

A scenario generator is a suitable tool to achieve the completeness of the data set so that it represents all conceivable scenarios, if possible. The simulated scenarios can cover similar problems associated with real data, such as sensor inaccuracies or noise due to communication technology shortcomings. In particular, non-deterministic channel fading can be added so that whole messages in particular can be lost. Combined with the 100 ms transmission interval for CAMs, this means that each vehicle bases its environment model on potentially old information. This makes the scenarios more realistic.

In order to achieve good coverage of the scenarios, the parameters can be varied as shown in Table 1 (FIG. 5). The ranges given reflect a typical situation for an overtaking maneuver on highways. The actual value for a given random scenario can be taken from a uniform distribution:

$$x = U(\text{x\_max}, \text{x\_min}), \tag{1}$$

where x_max represents a maximum value and x_min a minimum value of the distribution.

For parameters for which only integers are meaningful, such as the number of vehicles, the uniform distribution can be discrete. For all other values, especially for speeds and positions, the uniform distribution can be continuous.

The first vehicle generated is the host vehicle (HV), which departs randomly from the position s_hv=0 in the right or middle lane. Its speed is determined as a function of its lane ID 1 according to the following formula:

$$\text{v\_hv} \sim U(\text{v\_1\_max}, \text{v\_1\_max} + \text{v\_diff}), \tag{2}$$

where v_1_max is a fixed maximum speed for vehicles to be overtaken in lane 1. Next, the n_rv vehicles to be overtaken are generated. Their lane is randomly selected, with the first vehicle placed in the center or right lane with equal probability. The speed for the vehicle k to be overtaken in lane 1 can then be determined from:

$$\text{v\_rv}, k \sim U(\text{v\_1\_max}, \text{v\_1\_min}). \tag{3}$$

Here, v_1_max represents a maximum speed and v_1_min a minimum speed of the vehicle.

After all vehicles have been modeled, the following conditions can be met to obtain realistic scenarios. First, it can be specified that at least one vehicle to be overtaken is in the same lane as the HV and is traveling at least v_diff slower than it. If there is already a vehicle k to be overtaken in the correct lane (RV1 in FIG. 1), the speed difference can be checked and a recalculation can be performed according to:

$$\text{v\_hv} \sim U(\text{v\_rv}, k^* + \text{v\_diff}, \text{v\_1}, \text{max} + \text{v\_diff}), \tag{4}$$

in the event that this is required. If no suitable RV is found, a random RV k* can be selected on the two right lanes, then v_hv can be recalculated according to formula (4) and, in particular, the HV can be placed on the same lane as the RV k*.

Next, the vehicles to be overtaken can be positioned sensibly along the road. If the nearest RV in front of the HV (RV1 in FIG. 1) is closer than s_hvrv, a new position within the interval [s_hvrv_min; s_hvrv_max] can be determined uniformly. The interval can represent the distance limit between the HV and the RV. It can then be ensured that the distance to the respective preceding RV is at least s_dist for all other RVs on the same track (RV2 in FIG. 1), in particular by also redetermining the positions of the other RVs if necessary.

By applying the generation algorithm described above, many possible cooperation maneuvers can be generated, which can occur with up to n_rv vehicles to be overtaken in the training data.

After the initial configuration of the scenarios, controlled cooperative maneuvers can be simulated. In a simulation, the HV triggers a cooperative maneuver based on either a distance, such as the geometric distance to a slower vehicle ahead. Additionally or alternatively, triggering may also be based on other parameters, such as a time to collision or a composite parameter comprising a distance, a speed difference and/or a time to collision. Additionally or alternatively, triggering can also be based on external trigger information.

Before training, the maneuver suggestions can be generated randomly. Exemplary parameter ranges are given in Table 2 (FIG. 6) and are explained below.

First, the action sequence of the HV, consisting of n_hvc maneuver containers, is created. In particular, the last partial maneuver can be a lane change back to the right lane and/or to an exit lane. All n_hvc−1 maneuver containers before this can be filled with random maneuver types—"lane change" (cl), "speed change" (cs) or "maintain current driving status" (cn—whereby consecutive partial maneuvers of the same type are avoided in particular. The duration of all manoeuvres (t_cl, t_cs, t_cn) can be randomized within the limits specified in Table 2 (FIG. 6).

Next, the n_rvc,k sub-maneuvers can be generated for all existing vehicles to be overtaken. The maximum number of containers for remote vehicles, n_rvc, may be chosen to be lower than for the host vehicle, especially if it is assumed that vehicles to be overtaken perform fewer actions during an overtaking maneuver than the overtaking vehicle. While the general logic for generating sub-maneuvers may be the same as for the HV, additional restrictions may apply. For example, vehicles to be overtaken may only be allowed to change lanes to the right, in particular to avoid endangering the overtaking vehicle. Additionally or alternatively, when executing a partial maneuver to change speed, the target speed v_cs can be determined based on the current lane of the vehicle according to formula (3).

The host vehicle HV can then evaluate the resulting cooperative maneuver, which is made up of the actions of the HV and the RVs. In particular, it can check whether it will overtake at least one vehicle and/or whether vehicles will crash and/or perform illegal actions (e.g. fall below one or more safety distances). For example, if overtaking is only permitted by law on the left-hand side (as in Germany), cooperation maneuvers in which the HV overtakes a vehicle on the right-hand side can be rejected.

In one embodiment, during the training phase, the HV can generate random maneuvers until the maneuver can be successfully validated. It can then provide a final proposal to negotiate this cooperation maneuver with the vehicles to be overtaken. In particular, negotiation can take place in such a way that the proposed cooperation maneuver is approved or rejected by all vehicles covered by the cooperation maneuver, i.e. in particular by all vehicles to be overtaken. In a next step, the set of all executed cooperation maneuvers can be evaluated and later used for model training.

In order to identify good cooperation maneuvers, it is possible to first define what characterizes a good maneuver. This is advantageous because the trained network that evaluates the maneuvers is optimized according to the quality criteria used during training.

An important goal is to avoid collisions. Collisions generally mean that at least two machines participating in a cooperation maneuver have the same position at the same time. Additionally or alternatively, a collision can be defined by the fact that spatial and temporal safety distances between the machines and/or surrounding structures relevant to the cooperative maneuver are violated. If a cooperative overtaking maneuver is to be evaluated, a further criterion can be whether an overtaking maneuver has taken place or not. A successful cooperative maneuver can therefore be the result of a binary classifier, e.g. a collision-free overtaking maneuver.

Another quality criterion can be the jerk, for example as the third derivative of a position, which a vehicle exerts on a driver during a cooperation maneuver. Since high jerk values can be unpleasant for people in vehicles, a maximum jerk or a jerk integrated over the entire or parts of the cooperation maneuver can be used. In particular, it can be defined that small changes in acceleration below a lower threshold j do not cause any costs. If the maximum absolute jerk j_max exceeds this threshold, linearly increasing costs can be assumed (other formalizations are also possible):

$$w\_j = 0, \text{ if } j < j\_thr\_min \text{ and } w\_j = (j - j\_thr\_min)/j\_thr\_max, \text{ otherwise,} \tag{5}$$

where j_thr_min is a minimum jerk threshold value and j_thr_max is a maximum jerk threshold value. These can be defined:

$$j\_thr,\ min = 0.5(a\_max/1\ s) \text{ and } j\_thr,\ max = abs(a\_min/1\ s), \tag{6}$$

where a_max=2 ms^(−2) represents the assumed maximum acceleration and a_min=−4.5 ms^(−2) represents emergency braking.

Furthermore, in most cases, the HV can reach its destination faster during an overtaking maneuver than by following behind a slower vehicle. Therefore, a path length can be defined as a term of the quality function, namely the distance covered by the HV during the maneuver:

$$w\_hv = d\_hv/d^*\_hv - 1, \tag{7}$$

where d_hv is the longitudinal distance traveled by the HV during the maneuver and d*_hv is the distance it would travel in the same time if it were to slow down and stay behind a vehicle in front. By subtracting 1, we obtain w_hv>0 if the HV can travel further than in the uncooperative case, and w_hv<0 if it travels less distance. Maximizing the distance travelled (instead of minimizing it) does not lead to short overtaking maneuvers, but it does result in an advantageous improvement compared to the uncooperative case.

Additionally or alternatively, an average distance traveled by the vehicles to be overtaken can also be used.

Figure 3A:
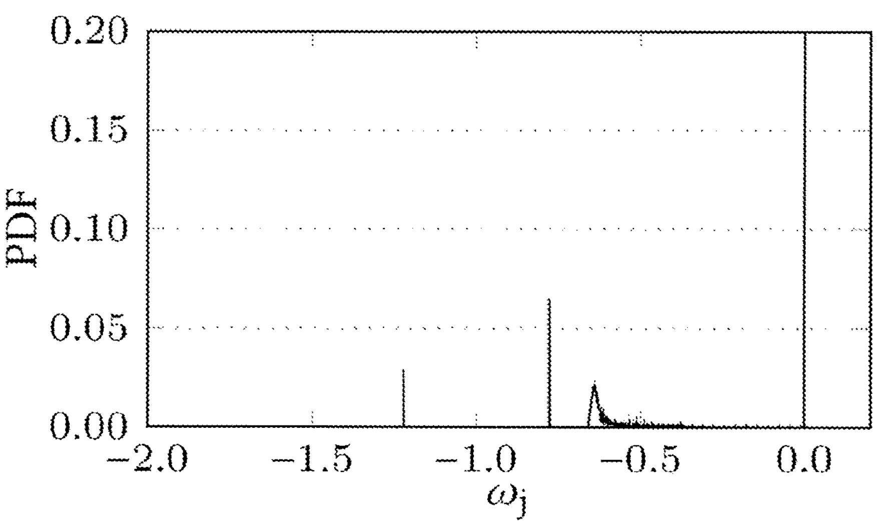
FIGS. 3*a*, 3*b* and 3*c* show a distribution of the quality function values of one embodiment of the invention.
Figure 3B:
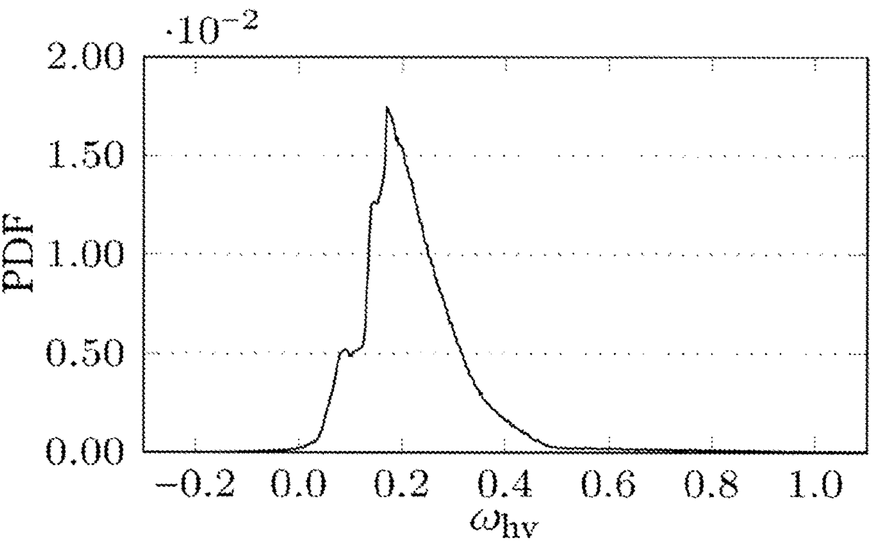

The distribution of the quality function values for 867,000 successful, randomized cooperative overtaking maneuvers is shown in FIG. 3. For w_j, according to FIG. 3*a*, the peaks at ≈−0.77 and ≈1.22 correspond to the abrupt emergency stops of a=0 m/s^2 and a=a_max respectively within one SUMO time step (0.1 s). For w_hv, according to FIG. 3*b*, the distribution shows that most of the generated cooperation maneuvers are able to slightly increase the distance covered by the HV. This is due to the fact that random maneuvers are validated and thus the HV manages to overtake at least one vehicle.

Various quality functions can be used. In the following, two different sets of quality function term weights y_j and y_hv are used as examples:

$$w = (y\_j * w\_j + y\_hv * w\_hv)/(y\_j + y\_hv) \tag{8}$$

Figure 3C:
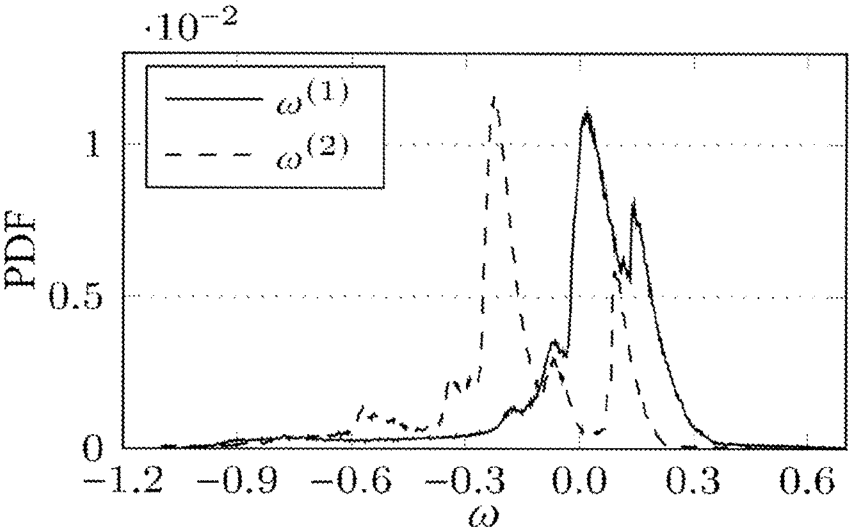

Formula (8) can be implemented on the basis of user preferences, as shown in Table 3 (FIG. 7). Of course, other user preferences can also be defined. Drivers in category 1 are primarily concerned with maximizing the distance they cover. To achieve this goal, they are prepared to accept large jerks. Drivers in category 2 are more receptive to jerks and are not prepared to sacrifice ride comfort for a longer distance. Other optimization goals could be the distance covered in relation to the maneuver duration (promoting high traffic throughput) or the maneuver duration itself (promoting faster cooperative maneuvers). In the following, the category-specific quality functions presented here are labeled w^(1) or w^(2). The resulting distribution for the quality function of both categories is shown in FIG. 3*c*.

The binary classification network was trained as an example on the basis of 800,000 generated cooperation maneuvers, which were randomly selected from 1067,000 cooperation maneuvers. The remaining 25% can be used for testing. Within the training set, a 5-fold cross-validation can be used as an example. Inputs are the scenarios, the proposed cooperation maneuver and the validation of the maneuver success. The scenario description includes the HV and up to n_rv RVs. The cooperation maneuvers can be described by the sub-maneuvers involved, i.e. vehicle IDs, maneuver types and duration. As an example, these 56 features were normalized for the training. The features are listed in Table 4 (FIG. 8). Unused features were initialized with 0, such as the parameters of the maneuver containers for non-existent RVs.

For example, based on a grid search for the network dimensions, a network with 6×128 neurons, without dropout layers and with a sigmoid activation function can be selected. Furthermore, an Adam optimizer and in particular a stack size of 32 can be used. The training performance can decrease exponentially with respect to the binary cross entropy loss with increasing training epochs. In the specific case of cooperative overtaking, a sensitivity ("recall") may be considered more critical than a positive prediction value ("precision"). This is because suggesting a maneuver that is classified as safe when it is not may put passenger safety at greater risk than rejecting a maneuver as unsafe that is safe.

Furthermore, the regression models that predict w^(1) and w^(2) can be trained. For this purpose, 75% of the data samples can be used for training and the remaining 25% for testing. In particular, only successful maneuvers need to be used. This reduces the number to 650000 cooperation maneuvers. The regression models can be trained based on the same 56 normalized features used for the binary classification, according to Table 4 (FIG. 8). In particular, relative values can be used for the lane and speed of the vehicles to be overtaken, as this advantageously simplifies the extrapolation. In particular, an overtaking maneuver need not depend on the absolute lane in which it takes place. However, it can depend in particular on which lanes the vehicles occupy relative to each other.

For example, the neural networks for the regression can consist of six layers of 512 neurons each for driver category 1 and eight layers of 4×512 and 4×256 for driver category 2. These dimensions can be found in particular via a grid search. In particular, no dropout layers need to be used. In addition, a rectified linear unit (ReLU) can be used as an activation function and the mean squared error (MSE) can serve as a loss function.

In particular, the algorithm shown in FIG. 4 can now be used to predict cooperative maneuvers. The initiating vehicle calls this algorithm whenever it has detected an opportunity for a cooperative maneuver. In particular, if the prediction is simulated, the call can also be made on the basis of an external trigger. Based on the currently perceived surrounding vehicles, the HV generates random maneuvers. They can include all surrounding vehicles, include an overtaking maneuver and avoid superfluous sub-maneuvers such as consecutive lane changes back and forth. The success of the generated cooperation maneuvers is then predicted using the binary classifier. The regression model then predicts the target value w_pred for the maneuvers classified as successful. The advantage of this two-stage implementation is that the optimal cooperation maneuver can be determined more quickly, as the regression is performed solely for the successful cooperation maneuvers. After n_gen of such evaluations, the HV selects the cooperation maneuver for which the highest w_pred is predicted and suggests it to the surrounding vehicles. These agree and the overtaking maneuver is executed. In addition, the surrounding vehicles can also reject or propose a modification to the cooperation maneuver or make it a condition for approval. In particular, a simulation with a cooperative maneuver can be carried out for each new scenario.

In particular, the time for generating suggestions can increase linearly depending on the number of random maneuver suggestions available for selection. The generation of a maneuver proposal, including scenario generation, success prediction and estimation of w_pred, can take on average 50 ms on an Intel i7-8665U CPU, with most of the time spent on the estimation of w_pred. Depending on the situation, it may be possible to wait 5 s for a cooperation maneuver to be proposed. A vehicle can therefore reduce the number of evaluated maneuvers n_gen to meet the requirements of a current driving situation. In addition, special hardware can be used to further reduce the calculation time. When applying the method, a compromise must be found between increasing the achievable w_pred and the time required to generate the maneuver candidates. An increase in the number of proposals n_gen improves the quality of the maneuver proposals in particular.

LIST OF REFERENCE SYMBOLS

HV—Host vehicle

RV1—remote vehicle

RV2—remote vehicle
RV3—remote vehicle
210—Scenario/maneuver generation
220—Maneuver simulation
230—Maneuver rating
240—Training model
250—Model Application
260—Evaluation

The invention claimed is:

1. A method for calculating a cooperative maneuver for at least two machines, comprising the steps of:
- obtaining environmental information pertaining to a common environment of the at least two machines;
- generating a plurality of cooperative maneuvers, each comprising at least one maneuver for each of the at least two machines, based on the environmental information;
- evaluating each cooperative maneuver based on a predefined quality criterion, wherein the evaluation of each cooperative maneuver comprises evaluating a subset of one or more maneuvers for each of the cooperative maneuvers based on the predefined quality criterion;
- selecting a cooperative maneuver based on a value of the quality criterion as determined by the evaluation;
- providing the selected cooperative maneuver for the at least two machines;
- performing a maneuver of the selected cooperative maneuver by at least one of the at least two machines.

2. The method according to claim 1, wherein the environmental information is at least partially detected by sensors by one of the two machines.

3. The method according to claim 1, wherein a maneuver for a machine comprises a plurality of sub-maneuvers.

4. The method according to claim 1, wherein the maneuvers of the individual vehicles are of different lengths in time and/or space.

5. The method according to claim 1, wherein the evaluation is carried out by a trained machine learning algorithm.

6. The method of according to claim 5, wherein the machine learning algorithm comprises a neural network.

7. The method according to claim 1, wherein the evaluation is carried out by a binary classification, wherein successful cooperation maneuvers are distinguished from unsuccessful cooperation maneuvers.

8. The method according to claim 7, comprising the step of stopping further processing of those maneuvers classified as unsuccessful by the binary classification.

9. The method according to claim 1, wherein the evaluation is carried out by a regression, by which a quality of the cooperative maneuver is determined.

10. The method according to claim 1, wherein the quality criterion is composed of a plurality of evaluation variables.

11. The method according to claim 1, wherein the selected cooperative maneuver is provided to at least one further machine.

12. The method according to claim 1, wherein one of the at least two machines is a host machine and wherein the host machine executes the providing of the selected cooperative maneuver to at least a second machine.

13. The method according to claim 1, further comprising the step of:
- confirming receipt of information of the provided cooperative maneuver by at least one of the at least two machines.

14. The method according to claim 1, wherein the evaluation is performed for only one of the maneuvers included in the cooperative maneuver.

15. The method according to claim 1, wherein the evaluation is performed only for an overtake maneuver included in the cooperative maneuver.

16. The method according to claim 1, wherein each of the at least two machines is an autonomous-driving vehicle.

17. The method according to claim 1, wherein evaluating each cooperative maneuver does not include at least one maneuver for at least one of the at least two machines.

18. A machine for providing a cooperative maneuver, configured to:
- detect by sensors, environmental information pertaining to a common environment of at least two machines;
- determine a plurality of cooperative maneuvers based on the environmental information, each of which comprises at least one maneuver for each of the at least two machines;
- evaluate each of the cooperative maneuvers based on a predefined quality criterion, wherein the evaluation of each cooperative maneuver comprises evaluating a subset of one or more maneuvers for each of the cooperative maneuvers included in the cooperative maneuver based on the predefined quality criterion;
- select a cooperative maneuver based on a value of the quality criterion as determined by the evaluation;
- provide the selected cooperative maneuver for the two machines;
- perform a maneuver of the selected cooperative maneuver.

19. The machine according to claim 18, wherein the step of determining a plurality of cooperative maneuvers is further based on an infrastructure unit not involved in the cooperative maneuvers.

20. A method for simulating a cooperative maneuver, comprising the steps of:
- obtaining environmental information pertaining to a common environment of at least two machine representations;
- generating a plurality of cooperative maneuvers, each comprising at least one maneuver for each of the at least two machine representations, based on the environmental information;
- evaluating each cooperative maneuver based on a predefined quality criterion, wherein the evaluation of each cooperative maneuver comprises evaluating only a part of the maneuvers included in the cooperative maneuver based on the predefined quality criterion;
- selecting a cooperative maneuver based on a value of the quality criterion as determined by the evaluation;
- performing the selected cooperative maneuver for the two machine representations.

* * * * *